US008228306B2

(12) United States Patent
Long et al.

(10) Patent No.: US 8,228,306 B2
(45) Date of Patent: Jul. 24, 2012

(54) INTEGRATION DESIGN FOR CAPACITIVE TOUCH PANELS AND LIQUID CRYSTAL DISPLAYS

(75) Inventors: Ding Hua Long, Shenzhen (CN); Hai Long Zhang, Shenzhen (CN); Hai Hui Zhang, Shenzhen (CN)

(73) Assignee: Flextronics AP, LLC, Broomfield, CO (US)

(*) Notice: Subject to any disclaimer, the term of this patent is extended or adjusted under 35 U.S.C. 154(b) by 312 days.

(21) Appl. No.: 12/507,438

(22) Filed: Jul. 22, 2009

(65) Prior Publication Data

US 2010/0045620 A1 Feb. 25, 2010

Related U.S. Application Data (60) Provisional application No. 61/082,887, filed on Jul. 23, 2008.

(51) Int. Cl.
*G06F 3/041* (2006.01)
(52) U.S. Cl. .......... 345/173; 345/156; 345/174; 349/74; 349/75; 178/18.01; 178/18.06
(58) Field of Classification Search .......... 345/156–179, 345/40, 204; 178/18.01–18.11, 20.01, 20.03; 382/312–314; 349/74–75
See application file for complete search history.

(56) References Cited

U.S. PATENT DOCUMENTS

| | | | |
|---|---|---|---|
| 4,550,221 A | 10/1985 | Mabusth | |
| 5,062,198 A | 11/1991 | Sun | |
| 5,379,057 A | 1/1995 | Clough et al. | |
| 5,459,463 A | 10/1995 | Gruaz et al. | |
| 5,488,204 A | 1/1996 | Mead et al. | |
| 5,495,077 A | 2/1996 | Miller et al. | |
| 5,543,588 A | 8/1996 | Bisset et al. | |
| 5,543,590 A | 8/1996 | Gillespie et al. | |
| 5,543,592 A | 8/1996 | Gaultier et al. | |
| 5,650,597 A | 7/1997 | Redmayne | |
| 5,675,362 A | 10/1997 | Clough et al. | |
| 5,730,165 A | 3/1998 | Philipp | |

(Continued)

FOREIGN PATENT DOCUMENTS

CN 1838151 A 9/2006

(Continued)

OTHER PUBLICATIONS

Touchscreenguide.com (http://www.touchscreenguide.com/touchscreen/res.html), as printed from the Internet on Oct. 28, 2011, 1 pg.

(Continued)

*Primary Examiner* — Lun-Yi Lao
*Assistant Examiner* — Priyank Shah
(74) *Attorney, Agent, or Firm* — Marsh Fischmann & Breyfogle LLP (57) ABSTRACT

An integrated touch screen and display device includes a polarizer with a layer of transparent conductive material deposited thereon. A touch screen controller is coupled to electrodes of the transparent conductive layer to detect the location of touches by, for example, a finger or stylus. A method for producing an integrated touch screen and display device includes applying a transparent conductive coating to an outer surface of a polarizer of a display device, creating electrodes in the conductive coating, and coupling the electrodes to a touch screen controller. A double super twisted nematic display that includes a capacitive touch panel integrated into a compensation cell of the display is also provided herein.

3 Claims, 9 Drawing Sheets

U.S. PATENT DOCUMENTS

| | | |
|---|---|---|
| 5,825,352 A | 10/1998 | Bisset et al. |
| 5,841,078 A | 11/1998 | Miller et al. |
| 5,854,450 A | 12/1998 | Kent |
| 5,854,625 A | 12/1998 | Frisch et al. |
| 5,861,583 A | 1/1999 | Schediwy et al. |
| 5,880,411 A | 3/1999 | Gillespie et al. |
| 5,920,310 A | 7/1999 | Faggin et al. |
| 5,940,065 A | 8/1999 | Babb et al. |
| 5,943,052 A | 8/1999 | Allen et al. |
| 6,091,406 A | 7/2000 | Kambara et al. |
| 6,188,391 B1 | 2/2001 | Seely et al. |
| 6,236,391 B1 | 5/2001 | Kent et al. |
| 6,288,707 B1 | 9/2001 | Philipp |
| 6,297,811 B1 | 10/2001 | Kent et al. |
| 6,373,474 B1 | 4/2002 | Katabami |
| 6,379,509 B2 | 4/2002 | Choi et al. |
| 6,380,929 B1 | 4/2002 | Platt |
| 6,380,931 B1 | 4/2002 | Gillespie et al. |
| 6,414,671 B1 | 7/2002 | Gillespie et al. |
| 6,441,809 B2 | 8/2002 | Kent et al. |
| 6,452,514 B1 | 9/2002 | Philipp |
| 6,466,036 B1 | 10/2002 | Philipp |
| 6,488,981 B1 | 12/2002 | Richter et al. |
| 6,492,979 B1 | 12/2002 | Kent et al. |
| 6,504,530 B1 | 1/2003 | Wilson et al. |
| 6,504,583 B2 | 1/2003 | Li et al. |
| 6,506,983 B1 | 1/2003 | Babb et al. |
| 6,535,200 B2 | 3/2003 | Philipp |
| 6,549,193 B1 | 4/2003 | Huang et al. |
| 6,555,235 B1 | 4/2003 | Aufderheide et al. |
| 6,587,097 B1 | 7/2003 | Aufderheide et al. |
| 6,723,929 B2 | 4/2004 | Kent |
| 6,738,051 B2 | 5/2004 | Boyd et al. |
| 6,750,852 B2 | 6/2004 | Gillespie et al. |
| 6,781,579 B2 | 8/2004 | Huang et al. |
| 6,784,873 B1 | 8/2004 | Boesen et al. |
| 6,809,280 B2 | 10/2004 | Divigalpitiya et al. |
| 6,819,316 B2 | 11/2004 | Schulz et al. |
| 6,825,833 B2 | 11/2004 | Mulligan et al. |
| 6,842,171 B2 | 1/2005 | Richter et al. |
| 6,856,259 B1 | 2/2005 | Sharp |
| 6,904,570 B2 | 6/2005 | Foote et al. |
| 6,927,761 B2 | 8/2005 | Badaye et al. |
| 6,943,705 B1 | 9/2005 | Bolender et al. |
| 6,961,049 B2 | 11/2005 | Mulligan et al. |
| 6,970,160 B2 | 11/2005 | Mulligan et al. |
| 6,977,646 B1 | 12/2005 | Hauck et al. |
| 6,993,607 B2 | 1/2006 | Philipp |
| 7,000,474 B2 | 2/2006 | Kent |
| 7,006,081 B2 | 2/2006 | Kent et al. |
| 7,030,860 B1 | 4/2006 | Hsu et al. |
| 7,061,475 B2 | 6/2006 | Kent |
| 7,102,621 B2 | 9/2006 | Roberts |
| 7,109,976 B2 | 9/2006 | Cobian |
| 7,109,978 B2 | 9/2006 | Gillespie et al. |
| 7,129,935 B2 | 10/2006 | Mackey |
| 7,148,704 B2 | 12/2006 | Philipp |
| 7,148,882 B2 | 12/2006 | Kamrath et al. |
| 7,151,532 B2 | 12/2006 | Schulz |
| 7,154,481 B2 | 12/2006 | Cross et al. |
| 7,158,122 B2 | 1/2007 | Roberts |
| 7,176,897 B2 | 2/2007 | Roberts |
| 7,176,902 B2 | 2/2007 | Peterson, Jr. et al. |
| 7,183,948 B2 | 2/2007 | Roberts |
| 7,190,350 B2 | 3/2007 | Roberts |
| 7,190,352 B2 | 3/2007 | Ling et al. |
| 7,196,694 B2 | 3/2007 | Roberts |
| 7,202,859 B1 | 4/2007 | Speck et al. |
| 7,212,189 B2 | 5/2007 | Shaw et al |
| 7,227,538 B2 | 6/2007 | Geaghan et al. |
| 7,236,161 B2 | 6/2007 | Geaghan et al. |
| 7,253,643 B1 | 8/2007 | Seguine |
| 7,253,809 B2 | 8/2007 | Boyd et al. |
| 7,254,775 B2 | 8/2007 | Geaghan et al. |
| 7,256,714 B2 | 8/2007 | Philipp |
| 7,277,087 B2 | 10/2007 | Hill et al. |
| 7,279,647 B2 | 10/2007 | Philipp |
| 7,295,190 B2 | 11/2007 | Philipp |
| 7,298,367 B2 | 11/2007 | Geaghan et al. |
| 7,303,809 B2 | 12/2007 | Choi et al. |
| 7,307,624 B2 | 12/2007 | Geaghan et al. |
| 7,315,300 B2 | 1/2008 | Hill et al. |
| 7,327,352 B2 | 2/2008 | Keefer et al. |
| 7,339,579 B2 | 3/2008 | Richter et al. |
| 7,515,140 B2 | 4/2009 | Philipp |
| 7,821,425 B2 | 10/2010 | Philipp |
| 7,821,502 B2 | 10/2010 | Hristov |
| 7,825,905 B2 | 11/2010 | Philipp |
| 7,903,092 B2 | 3/2011 | Philipp |
| 7,932,898 B2 | 4/2011 | Philipp et al. |
| 7,945,297 B2 | 5/2011 | Philipp |
| 7,969,330 B2 | 6/2011 | Philipp |
| 2001/0026330 A1 | 10/2001 | Oh |
| 2002/0030666 A1 | 3/2002 | Philipp |
| 2002/0145593 A1 | 10/2002 | Boyd et al. |
| 2002/0191029 A1 | 12/2002 | Gillespie et al. |
| 2003/0001826 A1 | 1/2003 | Richter et al. |
| 2003/0095111 A1 | 5/2003 | Song et al. |
| 2003/0103043 A1 | 6/2003 | Mulligan et al. |
| 2003/0132922 A1 | 7/2003 | Philipp |
| 2003/0137498 A1 | 7/2003 | Huang et al. |
| 2003/0184523 A1 | 10/2003 | Badaye et al. |
| 2003/0205450 A1 | 11/2003 | Divigalpitiya et al. |
| 2004/0008129 A1 | 1/2004 | Philipp |
| 2004/0008297 A1* | 1/2004 | Ozeki et al. ........................ 349/74 |
| 2004/0061687 A1 | 4/2004 | Kent et al. |
| 2004/0100448 A1 | 5/2004 | Moshrefzadeh |
| 2004/0104826 A1 | 6/2004 | Philipp |
| 2004/0135773 A1* | 7/2004 | Bang et al. ........................ 345/173 |
| 2004/0178997 A1 | 9/2004 | Gillespie et al. |
| 2004/0188150 A1 | 9/2004 | Richard et al. |
| 2004/0189882 A1 | 9/2004 | Jeong et al. |
| 2004/0252109 A1 | 12/2004 | Trent, Jr. et al. |
| 2005/0024341 A1 | 2/2005 | Gillespie et al. |
| 2005/0035953 A1 | 2/2005 | Woolley et al. |
| 2005/0041018 A1 | 2/2005 | Philipp |
| 2005/0052429 A1 | 3/2005 | Philipp |
| 2005/0078027 A1 | 4/2005 | Philipp |
| 2005/0110766 A1 | 5/2005 | Kent et al. |
| 2005/0110767 A1 | 5/2005 | Gomes et al. |
| 2005/0134772 A1* | 6/2005 | Elman et al. ..................... 349/117 |
| 2005/0140853 A1* | 6/2005 | Ozeki et al. ........................ 349/74 |
| 2005/0162408 A1 | 7/2005 | Martchovsky |
| 2005/0174335 A1 | 8/2005 | Kent et al. |
| 2005/0179673 A1 | 8/2005 | Philipp |
| 2005/0246459 A1 | 11/2005 | Philipp |
| 2005/0260338 A1 | 11/2005 | Chien |
| 2006/0038793 A1 | 2/2006 | Philipp |
| 2006/0092142 A1 | 5/2006 | Gillespie et al. |
| 2006/0097991 A1 | 5/2006 | Hotelling et al. |
| 2006/0132453 A1 | 6/2006 | Boyd et al. |
| 2006/0132462 A1 | 6/2006 | Geaghan |
| 2006/0139340 A1 | 6/2006 | Geaghan |
| 2006/0187214 A1 | 8/2006 | Gillespie et al. |
| 2006/0187216 A1 | 8/2006 | Trent, Jr. et al. |
| 2006/0192690 A1 | 8/2006 | Philipp |
| 2006/0202969 A1 | 9/2006 | Hauck |
| 2006/0202970 A1 | 9/2006 | Lii et al. |
| 2006/0207806 A1 | 9/2006 | Philipp |
| 2006/0238513 A1 | 10/2006 | Philipp |
| 2006/0274047 A1 | 12/2006 | Spath et al. |
| 2006/0274055 A1 | 12/2006 | Reynolds et al. |
| 2006/0284836 A1 | 12/2006 | Philipp |
| 2007/0002192 A1 | 1/2007 | Nishino et al. |
| 2007/0008299 A1 | 1/2007 | Hristov |
| 2007/0026089 A1 | 2/2007 | Hu |
| 2007/0052690 A1 | 3/2007 | Roberts |
| 2007/0062739 A1 | 3/2007 | Philipp et al. |
| 2007/0074914 A1 | 4/2007 | Geaghan et al. |
| 2007/0085838 A1 | 4/2007 | Ricks et al. |
| 2007/0091076 A1 | 4/2007 | Schulz |
| 2007/0103446 A1 | 5/2007 | Chien et al. |
| 2007/0109274 A1 | 5/2007 | Reynolds |
| 2007/0159561 A1 | 7/2007 | Chien |
| 2007/0176906 A1 | 8/2007 | Warren |
| 2007/0222766 A1 | 9/2007 | Bolender |
| 2007/0229466 A1 | 10/2007 | Peng et al. |

| | | |
|---|---|---|
| 2007/0229468 A1 | 10/2007 | Peng et al. |
| 2007/0229470 A1 | 10/2007 | Snyder et al. |
| 2007/0236475 A1 | 10/2007 | Wherry |
| 2007/0236478 A1 | 10/2007 | Geaghan et al. |
| 2007/0236618 A1 | 10/2007 | Maag et al. |
| 2007/0247443 A1 | 10/2007 | Philipp |
| 2007/0257893 A1 | 11/2007 | Philipp et al. |
| 2007/0257894 A1 | 11/2007 | Philipp |
| 2007/0262962 A1 | 11/2007 | XiaoPing et al. |
| 2007/0262963 A1 | 11/2007 | Xiao-Ping et al. |
| 2007/0264844 A1 | 11/2007 | Hu |
| 2007/0268265 A1 | 11/2007 | XiaoPing |
| 2007/0268266 A1 | 11/2007 | XiaoPing |
| 2007/0268276 A1 | 11/2007 | Kent et al. |
| 2007/0273560 A1 | 11/2007 | Hua et al. |
| 2007/0273561 A1 | 11/2007 | Philipp |
| 2007/0279395 A1 | 12/2007 | Philipp et al. |
| 2007/0291009 A1 | 12/2007 | Wright et al. |
| 2007/0291016 A1 | 12/2007 | Philipp |
| 2007/0296709 A1 | 12/2007 | GuangHai |
| 2008/0001925 A1 | 1/2008 | XiaoPing |
| 2008/0007434 A1 | 1/2008 | Hristov |
| 2008/0007534 A1 | 1/2008 | Peng et al. |
| 2008/0012832 A1 | 1/2008 | GuangHai |
| 2008/0018618 A1 | 1/2008 | Hill et al. |
| 2008/0024461 A1 | 1/2008 | Richter et al. |
| 2008/0029292 A1 | 2/2008 | Takayama et al. |
| 2008/0041641 A1 | 2/2008 | Geaghan et al. |
| 2008/0042994 A1 | 2/2008 | Gillespie et al. |
| 2008/0048978 A1 | 2/2008 | Trent, Jr. et al. |
| 2008/0048997 A1 | 2/2008 | Gillespie et al. |
| 2008/0062139 A1* | 3/2008 | Hotelling et al. ............. 345/173 |
| 2008/0074398 A1 | 3/2008 | Wright |
| 2008/0111714 A1 | 5/2008 | Kremin |
| 2008/0122802 A1* | 5/2008 | Furuhashi et al. ........... 345/174 |
| 2008/0123025 A1* | 5/2008 | Li et al. ............................ 349/74 |
| 2008/0138589 A1 | 6/2008 | Wakabayashi et al. |
| 2008/0142352 A1 | 6/2008 | Wright |
| 2008/0143683 A1 | 6/2008 | Hotelling |
| 2008/0150901 A1* | 6/2008 | Lowles et al. ................. 345/173 |
| 2008/0150905 A1 | 6/2008 | Grivna et al. |
| 2008/0150906 A1 | 6/2008 | Grivna |
| 2008/0158181 A1 | 7/2008 | Hamblin et al. |
| 2008/0158183 A1 | 7/2008 | Hotelling et al. |
| 2008/0165139 A1 | 7/2008 | Hotelling et al. |
| 2008/0165158 A1 | 7/2008 | Hotelling et al. |
| 2008/0186437 A1* | 8/2008 | Takahashi et al. ............ 349/117 |
| 2008/0264699 A1 | 10/2008 | Chang et al. |
| 2008/0303802 A1* | 12/2008 | Destura et al. ................. 345/175 |
| 2008/0309635 A1 | 12/2008 | Matsuo |
| 2009/0085891 A1 | 4/2009 | Yang et al. |
| 2009/0160824 A1 | 6/2009 | Chih-Yung et al. |
| 2009/0167710 A1 | 7/2009 | Jiang et al. |
| 2009/0194344 A1 | 8/2009 | Harley et al. |
| 2009/0231517 A1* | 9/2009 | Shiraogawa et al. ........... 349/75 |
| 2009/0236151 A1 | 9/2009 | Yeh et al. |
| 2009/0309850 A1 | 12/2009 | Yang |
| 2010/0045625 A1 | 2/2010 | Yang et al. |
| 2010/0066700 A1 | 3/2010 | Mozdzyn |
| 2010/0073319 A1 | 3/2010 | Lyon et al. |
| 2010/0271330 A1 | 10/2010 | Philipp |
| 2011/0157085 A1 | 6/2011 | Philipp |

FOREIGN PATENT DOCUMENTS

| | | |
|---|---|---|
| CN | 101122839 A | 2/2008 |
| JP | 2004280720 A | 10/2004 |
| KR | 200229845 Y1 | 7/2001 |
| KR | 10-2005-0100274 A | 10/2005 |
| KR | 10-2007-0081902 A | 8/2007 |
| KR | 100907512 B1 | 7/2009 |

OTHER PUBLICATIONS

Adler, R., et al., 'An Economical Touch Panel using SAW Absorption, IEEE Transactions on Ultrasonics, Ferroelectrics and Frequency Control, Mar. 1987, vol. 34, No. 2, pp. 195-201.

* cited by examiner

INTEGRATION DESIGN FOR CAPACITIVE TOUCH PANELS AND LIQUID CRYSTAL DISPLAYS

CROSS REFERENCE TO RELATED APPLICATION

This application claims priority from U.S. Provisional Application No. 61/082,887 filed Jul. 23, 2008, entitled "INTEGRATION DESIGN FOR CAPACITIVE TOUCH PANELS AND LIQUID CRYSTAL DISPLAYS", the entire contents of which are incorporated by reference herein.

BACKGROUND

Many devices use touch screens as a convenient and intuitive way for users to both view and enter information. Common applications include mobile phones, PDAs, ATMs, GPS navigation systems, electronic games, and computer interfaces, to name just a few examples. Touch screens allow a user to interact with a device by using a finger or stylus to touch displayed objects, such as icons, text, buttons, and the like. In some applications, a user may also "write" directly on a touch screen, such as in a PDA or other device that implements character recognition.

In practice, the input function of the touch screen and the output function of the display are typically performed by physically distinct devices. For example, a touch-sensitive device may be attached to the front of a standard display device. The touch sensitive device may detect the location of an object (e.g., a finger or a stylus) touching a screen, while the display device presents images to the user. A control device associated with the touch sensitive device correlates the location of the touch with the displayed images to understand the user's intent.

Polarizer-based touch screens can be very useful in applications where it is desirable to minimize reflection or glare. A polarizer is a device that filters an unpolarized or mixed-polarization beam of electromagnetic waves (e.g., light) to only pass waves with a single polarization state (e.g., a single linear polarization). Polarizers are used in many optical techniques and instruments, and polarizing filters find applications in photography as well as display technologies. Polarizers can be divided into two general categories: absorptive polarizers, where the unwanted polarization states are absorbed by the device, and beam-splitting polarizers, where the unpolarized beam is split into two beams with opposite polarization states, one of which is reflected and one of which is transmitted through the polarizer.

One common type of polarizer is absorptive-type Polaroid® film, which is made from polyvinyl alcohol (PVA) plastic with an iodine doping. Stretching of the plastic during manufacture ensures that the PVA chains are aligned in one particular direction. Electrons from the iodine dopant are able to travel along the chains, ensuring that the film absorbs light polarized parallel to the chains, while light polarized perpendicularly to the chains is transmitted.

Beam-splitting polarizers may work by reflecting unwanted light or by utilizing the birefringent properties of crystals to split off light of the desired polarity, among other ways. Another type of beam-splitting polarizer is a thin-film polarizer, which is created by layering an optical coating on a substrate material such as glass.

Regardless of the type of polarizer used, it may be desirable to apply one or more additional layers to a polarizer in a display device. For example, a polarizer may include a protective coating to guard against damage caused by physical impact or electrical discharges. This is especially true for polarizers used in touch screens, which must be durable enough to withstand frequent physical contact from a finger or stylus. However, adding layers to a polarizer may compromise the overall optical efficiency of a display device.

Polarizer touch screens are often employed in applications where it may be desirable that a touch screen display be readable in a range of lighting conditions from darkness to strong sunlight. Cell phones, PDAs, gas pumps, and ATM machines are all examples of applications that can benefit from polarizing touch screens. Touch screen display devices may also be used with CRTs, OLED displays, LCDs, and plasma displays. In many applications, especially but not exclusively portable devices, it is also desirable to minimize the thickness of a display device, as this factor can contribute to overall size and weight of an electronic device.

Many display devices use one or more polarizers to control how light interacts with or is emitted by the display. For example, an organic light emitting diode (OLED) display may use a polarizer to reduce interference from environmental light sources. Liquid crystal display (LCD) devices generally have front and back polarizers that are typically oriented orthogonally with respect to each other and separated by a field of liquid crystal material. Behind the back polarizer is a backlight or, less commonly, a reflective surface. Images appear on the display when light is transmitted from the backlight through both of the back and front polarizers. As the polarizers are crossed, however, light passing through the back polarizer is aligned so that it will not pass through the front polarizer without first being realigned. To produce images on the display, the liquid crystal material is stimulated according to a desired pattern, causing the polarization of the light to be rotated in places where it is desired to transmit light and leaving other areas dark.

Figure 1A:
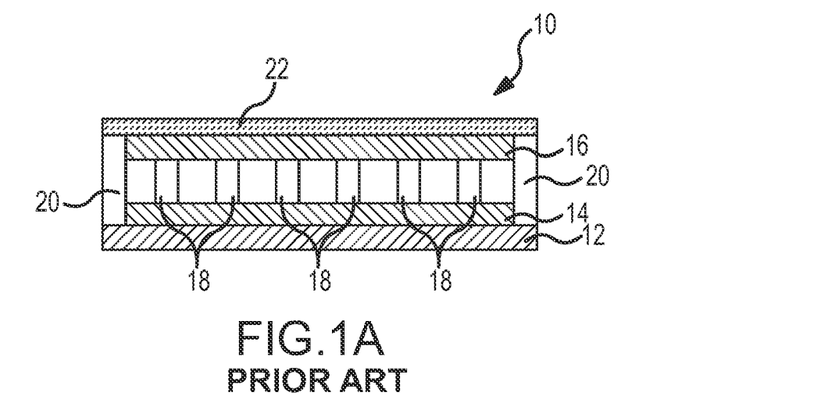
FIG. 1A illustrates a touch screen according to the prior art.
Figure 1B:
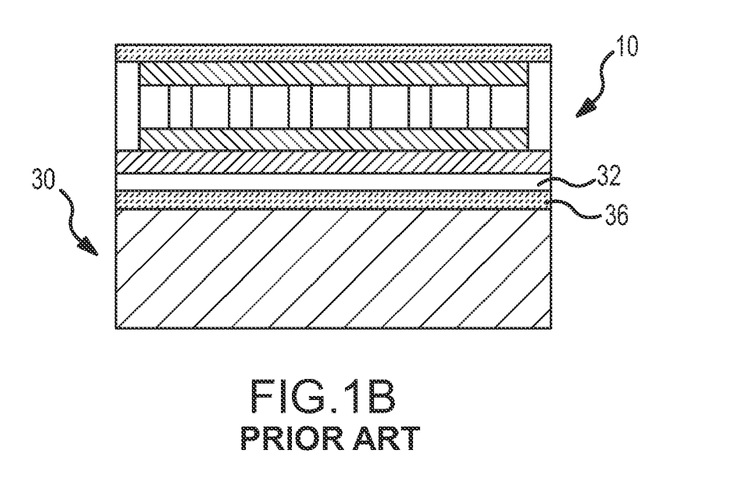
FIG. 1B illustrates a touch screen display according to the prior art.

One common touch screen type used with display devices is a resistive touch screen. FIG. 1A illustrates a typical resistive-type touch screen 10 according to the prior art. A glass substrate 12 supports two layers of ITO electrodes 14, 16 separated by an array of dot spacers 18. Seal frits 20 form the outer edges of the touch screen 10, which has a protective layer of PET film 22 on its surface. The resistive touch screen 10 functions by detecting changes in resistance between electrodes on the upper ITO layer 16 and the lower ITO layer 14 when a touch from a finger or stylus deforms the upper ITO layer 16 toward the lower ITO layer 14 at the location of the touch. To form a touch screen display device, the resistive touch screen 10 is laminated onto a display device such as the LCD device 30 of FIG. 1B. A layer 32 of optical clear adhesive (OCA) or double-sided adhesive tape may be used to bind the resistive touch screen 10 to the LCD display 30. The LCD display 30 may include a front polarizer 36, which in turn may have a protective layer (e.g., TAC film or other polymer) on its outer surface (not shown).

Figure 2:
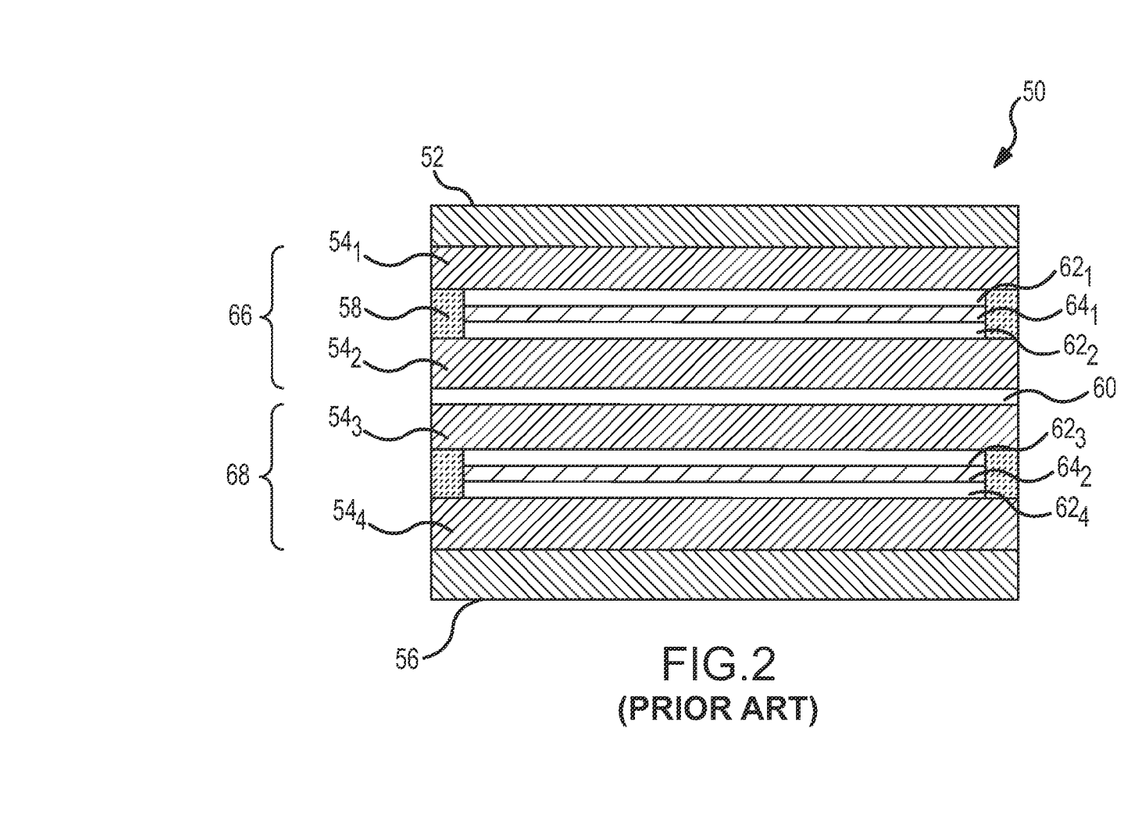
FIG. 2 illustrates a cross-sectional view of a double super twisted nematic (DSTN) display according to the prior art.

FIG. 2 illustrates another type of a display device, namely, a double super twisted nematic (DSTN) type LCD device 50. As the name implies, the device 50 utilizes two liquid crystal cells 66, 68 that include super twisted nematic crystals. Generally, twisted nematic (TN) liquid crystal cells include liquid crystals that are twisted at 90 degree angles. TN liquid crystals cells are widely used in small displays, such as wrist watches, small measuring devices, or the like. This is generally due to their relatively low voltage, low power consumption, and long life span. However, for larger displays and/or better quality displays, a liquid crystal cell that includes a larger twisted angle is required. In this regard, a super twisted nematic (STN) liquid crystal may be used, which may, for example, have a twisted angle somewhere in the range of 180 to 270 degrees.

The DSTN device 50 shown in FIG. 2 includes a liquid crystal display cell 68 that includes two transparent plates $54_3$ and $54_4$ (e.g., glass or plastic plates) arranged parallel to each other. The display cell 68 also includes ITO layers $62_3$ and $62_4$ (or another type of conductive layer) that are fitted on the surfaces of the plates $54_3$ and $54_4$ that face each other. A liquid crystal layer $64_2$ is disposed between the ITO layers $62_3$ and $62_4$. Depending upon the applied voltage to one or more electrodes of the ITO layers $62_3$ and $62_4$, the liquid crystal $64_2$ changes the plane of polarization of the light penetrating through the liquid crystal layer.

The outer surfaces of the device 50 may include a top polarizer 52 and a bottom polarizer 56. The polarizers 52, 56 function to filter the transmitted light so that the light passes in only one plane of polarization. Thus, light beams are transmitted or blocked depending upon the position of the polarizers 52 and 56 with respect to one another and the voltage applied by electrodes of the ITO layers $62_3$ and $62_4$ to the liquid crystal $64_2$, with the result that a corresponding driven pixel of the display appears dark or bright. In this regard, images may be displayed on the device 50 by selectively controlling the brightness of each pixel.

To improve image quality, the DSTN device 50 also includes a liquid crystal compensation cell 66 that may be coupled to the display cell 68 using an adhesive 60 (e.g., an optically clear adhesive (OCA) or double-sided adhesive tape). Like the display cell 68, the compensation cell 66 includes two transparent plates $54_1$ and $54_2$ arranged at a distance from each other. The compensation cell 66 also includes ITO layers $62_1$ and $62_2$ (or another type of conductive layer) that are fitted on the surfaces of the plates $54_1$ and $54_2$ that face each other. A liquid crystal layer $64_1$ is disposed between the ITO layers $62_1$ and $62_2$.

The compensation cell 66 may essentially be similar to the display cell 68, except that the twisted angle of liquid crystal layer $64_1$ of the compensation cell 66 is in the opposite direction of the twisted angle of the liquid crystal layer $64_2$ of the display cell 68. In operation, a linear polarized light beam may be changed into elliptical polarized light when it is passed through the display cell 68. However, the elliptical polarized light is changed back into the linear polarized light while passing through the compensation cell 66, thereby eliminating the tinted color and providing a black and white display.

As described above, touch screen displays are typically formed by overlaying a touch screen device on a display device. A touch screen in this context typically includes a substrate that supports a multi-layered touch sensitive device. This device is typically laminated onto a display device using an adhesive such as optical clear adhesive (OCA). When a separate conventional touch sensitive device is attached in front of a display to create a touch screen, less of the light emitted by the display reaches the user, resulting in a decrease in display contrast. Other disadvantages of overlaying a separate touch sensitive device on a display device include greater overall touch screen thickness, higher cost, and reduced reliability.

SUMMARY

The following embodiments and aspects of thereof are described and illustrated in conjunction with systems, tools, and methods which are meant to be exemplary and illustrative, and not limiting in scope. In various embodiments, one or more of the above-described problems have been reduced or eliminated, while other embodiments are directed to other improvements.

According to a first aspect, an integrated touch screen and display device is provided. The device includes a display having a front polarizer, wherein the front polarizer has an outer surface, and a conductive coating deposited over the outer surface of the front polarizer. The conductive coating is substantially transparent and comprises a plurality of electrodes. The device further includes a touch screen controller communicatively coupled to the electrodes.

According to a second aspect, a method for producing an integrated touch screen and display device including a front polarizer is provided. The method includes applying a conductive layer over an outer surface of the polarizer of the display device. The method also includes forming electrodes in the conductive layer, and coupling the electrodes to a touch screen controller.

According to a third aspect, a double super twisted nematic (DSTN) liquid crystal display (LCD) is provided. The display includes a liquid crystal display cell that includes first and second transparent plates arranged parallel to each other, first and second transparent conductive layers formed on opposing surfaces of the first and second transparent plates, respectively. The first and second transparent conductive layers include a plurality of electrodes. The liquid crystal display cell also includes a first liquid crystal sealed between the first and second transparent conductive layers. The display also includes a liquid crystal compensation cell disposed over the liquid crystal display cell. The liquid crystal compensation cell includes a third and fourth transparent plate arranged parallel to each other. The liquid crystal compensation cell also includes third and fourth transparent conductive layers formed on a surface of each of the third and fourth transparent plates, respectively, the third and fourth transparent conductive layers including a plurality of electrodes. The liquid crystal compensation cell further includes a second liquid crystal sealed between the third and fourth transparent conductive layers. The display also includes a touch screen controller communicatively coupled to the plurality of electrodes of at least one of the third and fourth conductive layers.

In addition to the exemplary aspects and embodiments described above, further aspects and embodiments will become apparent by reference to the drawings and by study of the following descriptions.

DETAILED DESCRIPTION

Reference will now be made to the accompanying drawings, which assist in illustrating the various pertinent features of the embodiments presented herein. Although described primarily in conjunction with an LCD display, it should be expressly understood that the integrated touch screen display may be applicable to other display types and applications including, but not limited to, personal computers, mobile phones, ATMs, consumer electronics devices, PDAs, printers, game consoles, GPS systems, or any other device having a touch screen display. Also, while the application of a transparent conductive layer to a polarizer is described in the context of providing a protective layer or touch screen functionality, it should be expressly understood that this utility may be applicable to other optical elements that include a polarizer. In this regard, the following description is presented for purposes of illustration and description. Furthermore, the description is not intended to limit the disclosed embodiments to the form disclosed herein. Consequently, variations and modifications commensurate with the following teachings, and skill and knowledge of the relevant art, are within the scope of the present application.

Figure 3:
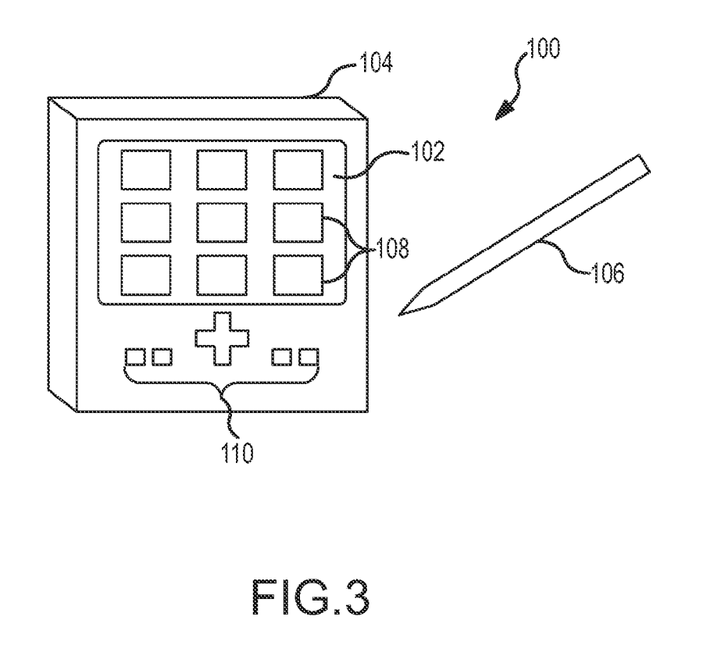
FIG. 3 illustrates an embodiment of an integrated touch screen display device.

FIG. 3 illustrates a device 100 having an integrated touch screen display 102. The device 100 may also include a housing 104 and a number of buttons 110. The device 100 may be, by way of example and not of limitation, a cell phone, game system, PDA, media player, or any other device that includes a touch screen display. In this regard, specific features of the device 100 may vary. One or more objects 108 may be displayed on the integrated touch screen display 102. The objects 108 may include, without limitation, graphics, icons, text, buttons, images, and the like. A user may interact with the device 100 by touching the touch screen display 102 where one or more objects 108 appear, for example, with a stylus 106 or a finger (not shown).

Figure 4:
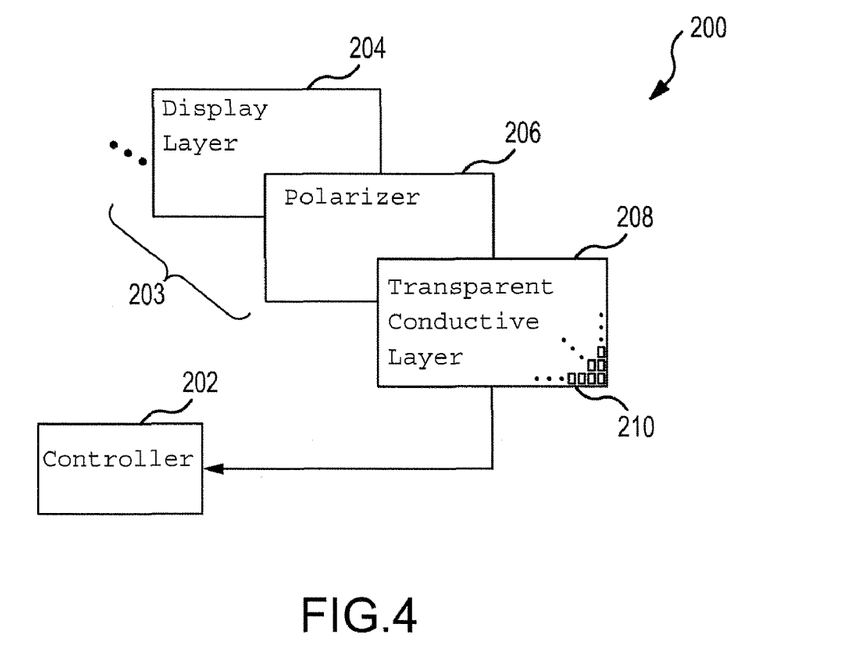
FIG. 4 illustrates another embodiment of an integrated touch screen display.

FIG. 4 illustrates certain aspects of an integrated touch screen device 200, which includes a display 203 having a number of layers 204, 206, one of which is a polarizer 206. A transparent conductive layer 208 may be applied to an outer surface of the polarizer 206. Applying the transparent conductive layer 208 to the outer surface of the polarizer 206 may include applying a coating of a transparent conductive material directly to the outer surface of the polarizer 206, such as by using a vacuum sputtering process, electron-beam evaporation, or any other suitable process. In this regard, the transparent conductive material may be coated directly onto the outer surface of the polarizer 206 of the display 203. The display 203 may be, for example, a liquid crystal display, an OLED display, or any suitable display type. The polarizer 206 may be any type of polarizer, including without limitation, an absorptive-type polarizer such as Polaroid® film, or a beam-splitting polarizer such as a thin-film polarizer.

The polarizer 206 may further have an outer surface that faces the user when the device is in use. This outer surface may include, for example, a polymeric film (e.g., a triacetyl cellulose (TAC) layer) that serves as a protective layer. In such embodiments, the transparent conductive layer 208 may be applied to an outer surface of the polymeric film. The transparent conductive layer 208 may include, for example, indium tin oxide (ITO) or any conductive material of suitable transparency. By applying a transparent conductive layer 208 to an outer surface of the polarizer 206, it may be possible to provide a protective layer for the polarizer 206. Furthermore, it may be possible to provide added functionality by providing electrodes in the transparent conductive layer 208. For example, this may provide an advantage in applications where a polarizer is used in conjunction with a touch screen display.

According to one aspect, the integrated touch screen device 200 functions by displaying one or more objects on the display 203 such that a user can select an object by touching the outer surface of the integrated touch screen device 200 at the place where the image appears. Additionally or alternatively, a user may enter input (e.g., text) by "writing" on the integrated touch screen display using their finger or a stylus. In any case, a touch screen controller 202 that is coupled to the conductive layer 208 may sense inputs from the user and correlates them to screen locations. Specifically, a plurality of electrodes (e.g., the representative electrodes 210) may be disposed within (or formed by) the transparent conductive layer 208. When a user touches (or comes proximate to) one or more of the electrodes 210, a corresponding signal is sent to the touch screen controller 202. In this regard, the touch screen controller 202 serves to determine where the user touched the integrated touch screen device 200, thereby revealing the user's selection. The touch screen controller 202 may include drive/sense circuitry that is operable to apply a voltage and/or current to the electrodes 210 that enable sensing of a touch by a user. The touch screen controller 202 may be a custom integrated circuit suitable for a unique application, or a controller readily available from commercial vendors. The touch screen controller 202 may function, for example, by driving the electrodes 210 with a voltage that causes a capacitance on the electrodes 210, then sensing a change (e.g., distortion) in the capacitance due to a user's finger or stylus that comes in proximity to the electrodes 210.

The transparent conductive layer 208 may be touched directly by the user, or there may be an additional protective layer or layers over the transparent conductive layer 208. In one embodiment, the transparent conductive layer 208 includes indium tin oxide (ITO). The electrodes 210 may be created, for example, using an etching process. The integrated touch screen device 200 may function as a capacitive type touch screen by having the touch screen controller 202 sense changes in capacitance at the electrodes 210 that occur when the electrodes 210 are touched by, for example, a finger or stylus, or when they are brought into close proximity with a finger or stylus.

Figure 5:
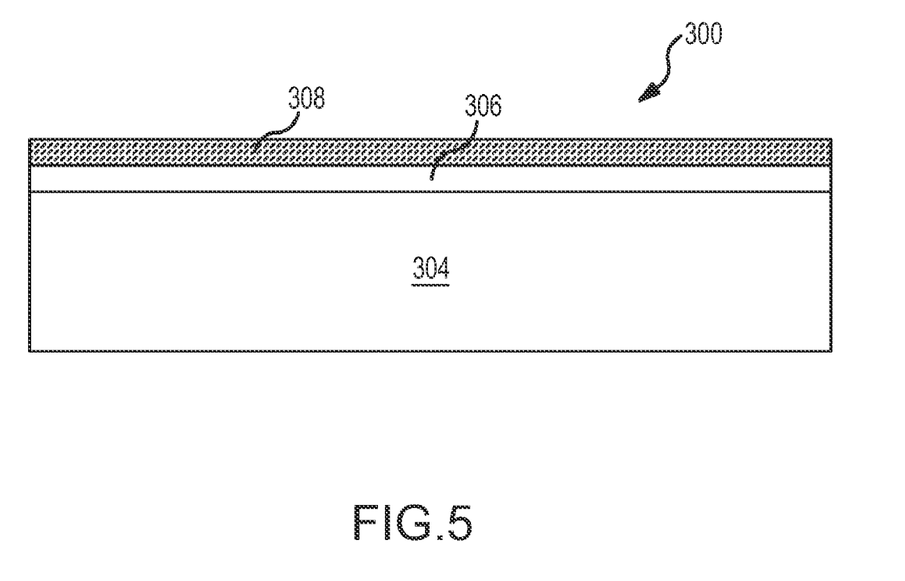
FIG. 5 is a cross-sectional view of an integrated touch screen display.

FIG. 5 illustrates a cross-sectional view of an integrated touch screen device 300. The integrated touch screen device 300 includes a display 304 that includes a polarizer 306, on top of which is a transparent conductive layer 308. The polarizer 306 may be the only polarizer in the display 304, such as is typical of an OLED display, or it may be the outermost (or "front" polarizer) of two polarizers often used in a LCD display. The transparent conductive layer 308 (e.g., an ITO layer) is deposited on an outer surface of the polarizer 306. For example, the polarizer 306 may include a polarizing film sandwiched between two layers of polymeric film such as triacetyl cellulose (TAC), such that the transparent conductive layer 308 is deposited on an outer TAC layer of the polarizer 306. By disposing the transparent conductive layer 308 directly on the polarizer 306, the integrated touch screen device 300 may have a thickness that is at least about 0.5 to 1 millimeters less than the combined thickness of the touch screen 10 and the display 30 shown in FIG. 1B.

Figure 6A:
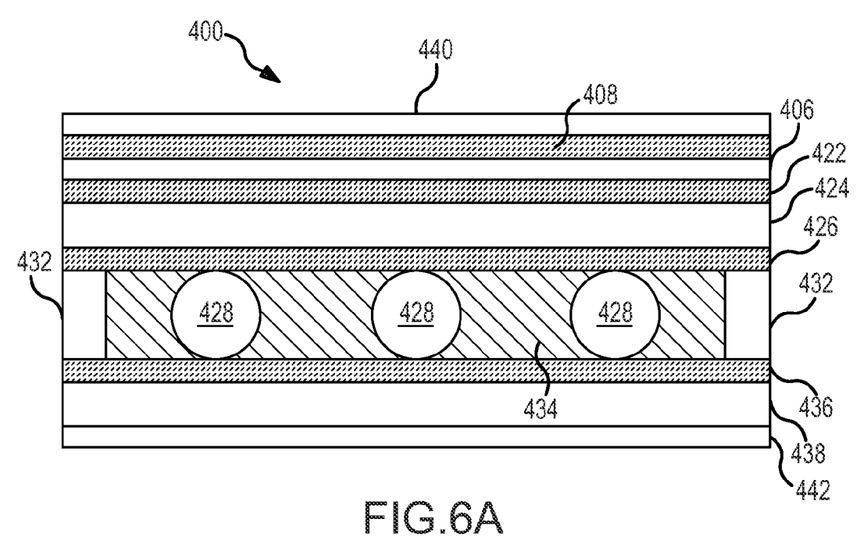
FIGS. 6A and 6B are cross-sectional views of an integrated touch screen display including a liquid crystal display.

FIG. 6A illustrates a cross-sectional view of an integrated touch screen display 400 wherein the display portion is a liquid crystal display. A field of liquid crystal material 434 is surrounded by two layers 426, 436 of patterned ITO electrodes designed to produce desired display images. Seal frits 432 contain the liquid crystal material 434 within the display 400. Spacers 428 serve to maintain the separation of the adjacent ITO layers 426, 436 at a uniform distance. It is noted that FIG. 6A is not drawn to scale; for example, the size of the spacers 428 relative to the volume of liquid crystal material 434 is greatly exaggerated. On either side of the ITO layers 426, 436 is a glass substrate 424, 438, respectively. The polarization axes of a front polarizer 406 and a back polarizer 442 may typically be aligned orthogonally with respect to each other. A transparent conductive layer 408, such as an ITO layer, is deposited on an outer surface of the front polarizer 406. The transparent conductive layer 408 includes an array of touch-sensitive electrodes, as described above with reference to FIG. 3. In one embodiment, the front polarizer 406 includes a polymeric film (not shown) layered on an outer surface of the front polarizer 406, such that the transparent conductive layer 408 is applied to an outer surface of the polymeric film. Optionally, a clear protective coating 440 may be laminated over the transparent conductive layer 408 to protect the electrodes of the transparent conductive layer 408 from damage. It should be appreciated that the display 400 may include other layers that are not shown (e.g., LCD alignment layers, retardation film layers, etc.).

Figure 6B:
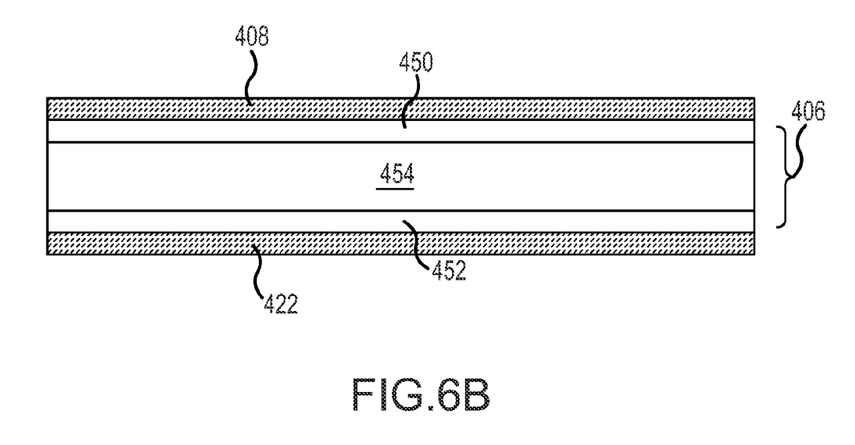

Specific embodiments may depend on the structure of the front polarizer 406. For example, as shown in FIG. 6B, the polarizer 406 may include a polarizing film 454 sandwiched between two layers of TAC film 450, 452 (FIG. 6B), such that the transparent conductive layer 408 is disposed on an outer surface of the outer layer of TAC film 450. According to another variant, a second layer 422 of ITO or other transparent conductive material may be disposed on the opposite side of the front polarizer 406 (i.e., on the side facing the liquid crystal material 434) to act as a protective layer. For example, such an inner transparent conductive layer 422 may serve to electrically isolate components of the display from the touch screen and to protect the display from electrostatic discharge. Similarly, this embodiment may provide protection for the electrodes on the transparent conductive layer 408 from interference that might otherwise come from the inner display components.

The integrated touch screen display 400 may have an overall thickness of less than about 2 mm. The integrated touch screen display 400 may also have a light transmission or contrast that is at least about 20% better than would be achieved by overlaying a separate touch screen onto an LCD display.

Figure 7:
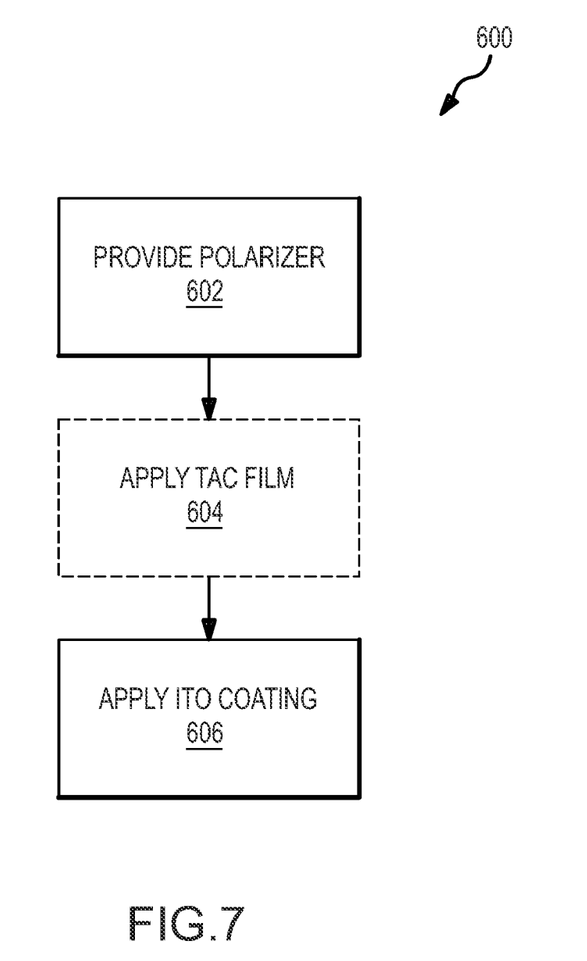
FIG. 7 is a flowchart showing a method for producing an optical element.

FIG. 7 illustrates a method 600 for producing an optical element that begins by providing (602) a polarizer having an outer surface. The polarizer may be manufactured by any appropriate means and may include a number of layers. As is shown in dashed lines, a protective layer in the form of a polymeric film such as a TAC layer may optionally be applied (604) to form the outer surface of the polarizer. A transparent conductive coating may then be applied (606) to the outer surface of the polarizer. The transparent conductive coating may include indium tin oxide (ITO) and may be deposited on the outer surface of the polarizer by any appropriate means. For example, applying (606) the transparent conductive coating may include a vacuum sputtering process. In embodiments that include a TAC film as an outer surface of the polarizer, the transparent conductive layer may be deposited directly onto the TAC film. In one embodiment, the polarizer includes iodine that cannot endure temperatures above approximately 80° C. without degradation in polarizer performance. In such an embodiment, applying (606) the transparent conductive coating may be performed at a temperature of approximately 80° C. or less.

Figure 8:
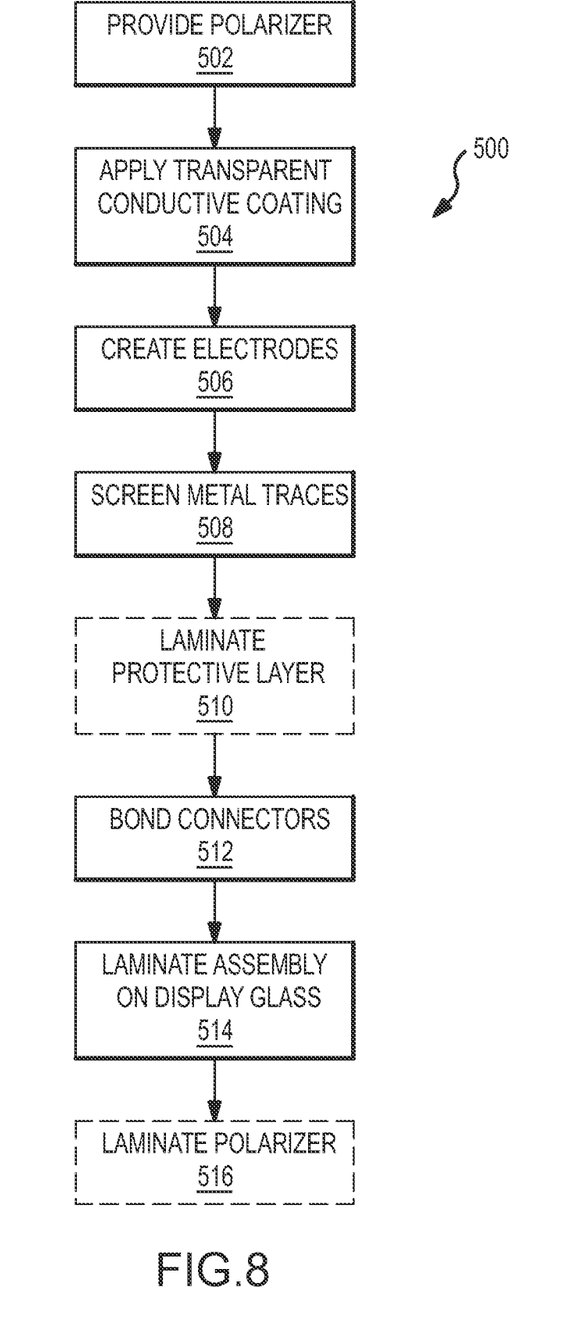
FIG. 8 is a flowchart showing a method for producing an integrated touch screen display.

FIG. 8 is a flowchart illustrating a method 500 for producing an integrated touch screen display device, such as the integrated touch screen display device 200 shown in FIG. 4. The method 500 begins by providing (502) a display having a polarizer with an outer surface. A transparent conductive layer or coating (e.g., ITO) is applied (504) to the outer surface of the polarizer. An electrode pattern is created (506) in the transparent conductive coating using, for example, a dry etch process. A number of metal traces may then be screened (508) outside an active area of the transparent conductive coating to provide connectivity to a touch screen controller (e.g., the touch screen controller 202 shown in FIG. 4). Optionally, a clear protective layer may then be laminated (510) over the transparent conductive coating. After bonding (512) the metal traces or connectors, the entire polarizer/touch screen assembly may be laminated (514) onto the top glass portion of any appropriate type of display. Optionally, a protective layer may be laminated (516) onto the polarizer/touch screen assembly.

Figure 9:
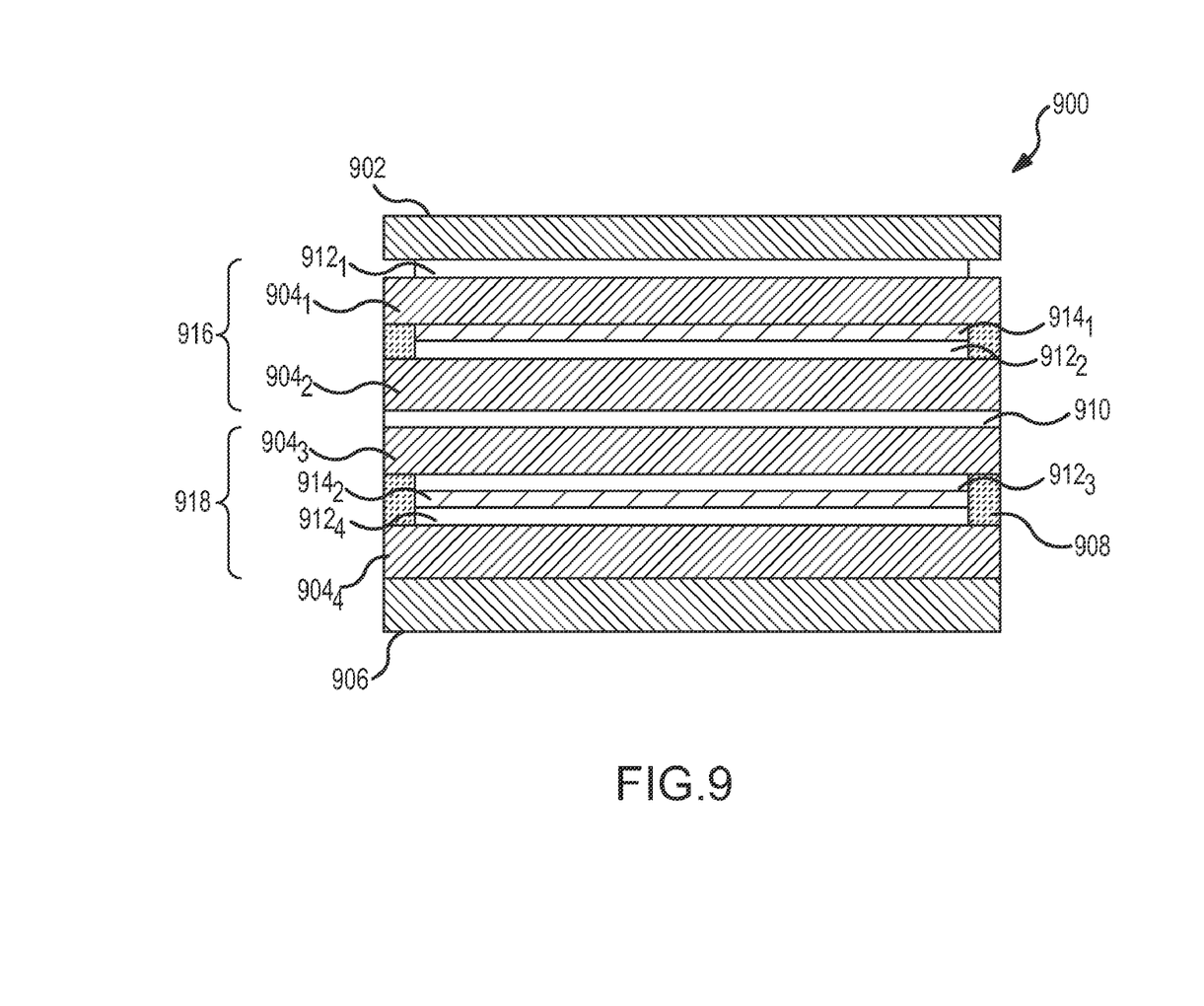
FIG. 9 illustrates a cross-sectional view of a double super twisted nematic (DSTN) display that includes an integrated touch panel.

FIG. 9 illustrates a cross-sectional view of a DSTN device 900 that includes an integrated touch screen display. Similar to the DSTN device 50 shown in FIG. 2, the DSTN device 900 includes a liquid crystal display cell 918 that includes two transparent plates $904_3$ and $904_4$ (e.g., glass or plastic plates) arranged parallel to each other. The display cell 918 also includes ITO layers $912_3$ and $912_4$ that are disposed on the surfaces of the plates $904_3$ and $904_4$ that face each other. A liquid crystal layer $914_2$ is disposed between the ITO layers $912_3$ and $912_4$. Depending upon the applied voltage to one or more electrodes of the ITO layers $912_3$ and $912_4$, the liquid crystal $914_2$ may change the plane of polarization of the light penetrating through the liquid crystal layer. The outer surfaces of the DSTN device 900 may include a top polarizer 902 and a bottom polarizer 906. The polarizers 902, 906 may function to filter the transmitted light so that the light passes in only one plane of polarization. Thus, the light beams are transmitted or blocked depending upon the position of the polarizers 902 and 906 with respect to one another and the voltage applied by electrodes of the ITO layers $912_3$ and $912_4$ to the liquid crystal $914_2$, with the result that a corresponding driven pixel of the display appears dark or bright. In this regard, the DSTN display 900 may be used to display images to one or more users.

In this embodiment, a compensation cell 916 is provided that includes an integrated capacitive touch panel. The compensation cell 916 may be coupled to the display cell 918 using an adhesive 910 (e.g., an OCA, double-sided adhesive tape, or the like). If the adhesive 910 includes OCA, the OCA may be laminated on the full surface area of the cells 916 and/or 918, without any gap between the top and bottom layers. Alternatively, if the adhesive includes double-sided adhesive tape, the adhesive tape may just be laminated on the border (perimeter) of the cells 916 and/or 918, and the viewing area becomes an air gap. Like the display cell 918, the compensation cell 916 includes two transparent plates $904_1$ and $904_2$ arranged at a distance from each other. The compensation cell 916 also includes ITO layers $912_1$ and $912_2$ that are positioned on the surfaces of the plates $904_1$ and $904_2$. A liquid crystal layer $914_1$ is disposed between the ITO layers $912_1$ and $912_2$.

To integrate a capacitive touch panel into the compensation cell 916, the top and bottom ITO layers $912_1$ and $912_2$ of the compensation cell 916 are designed to also be the top and bottom ITO patterned electrodes of a projective capacitive touch panel. To reduce the impact of crossover area between the top and bottom touch panel ITO electrodes on the performance of the display, the top ITO electrodes $912_1$ may be disposed on the top surface of the plate $904_1$, rather than the bottom. That is, the ITO layers $912_1$ and $912_2$ may be arranged in a "face to back" orientation, rather than a "face to face" orientation as in the prior art compensation cell 66 shown in FIG. 2.

By combining DSTN technology with capacitive type touch panel technology, the embodiments described herein eliminate the need to attach a separate touch panel on the top surface of a display to achieve touch sensing capabilities. Thus the present designs achieve high product reliability, good touch sensitivity, dual touch functionality, and very good contrast even at extreme temperatures (e.g., greater than 80 degrees C. and less than −20 degrees C.).

It has been recognized by the inventors that it would be desirable to integrate touch screen functionality into a display device. In embodiments presented herein, this may be achieved by integrating touch screen functionality directly on a surface of a polarizer in a display device, or in a compensation cell of a DSTN display. Thus, additional overhead in both size and manufacturing cost of overlaying a separate touch screen onto a display device may be avoided. Furthermore, eliminating the glass substrate typically used in a touch screen by integrating touch screen functionality directly into a display device may reduce the risk of breakage and improve the robustness of the overall device.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed:

1. A double super twisted nematic (DSTN) liquid crystal display (LCD), comprising:
    an LCD cell comprising first and second transparent plates arranged parallel to each other, first and second transparent conductive layers formed on opposing surfaces of the first and second transparent plates, respectively, the first and second transparent conductive layers comprising a plurality of electrodes, and a first liquid crystal sealed between the first and second transparent conductive layers;
    a liquid crystal compensation cell disposed over the LCD cell, the liquid crystal compensation cell comprising a third and fourth transparent plate arranged parallel to each other, third and fourth transparent conductive layers formed on a surface of each of the third and fourth transparent plates, respectively, the third and fourth transparent conductive layers comprising a plurality of electrodes, and a second liquid crystal sealed between the third and fourth transparent conductive layers, wherein the third and fourth conductive layers are formed on a top surface of each of the third and fourth transparent plates, wherein the top surface of each of the third and fourth transparent plates face a common direction;
    a front polarizer disposed on the third transparent conductive layer;
    a rear polarizer disposed on the second transparent plate, wherein the LCD and the liquid crystal compensation cell are disposed between the front and rear polarizers; and
    a touch screen controller communicatively coupled to the plurality of electrodes of at least one of the third and fourth conductive layers to sense a change in capacitance on at least one of the third and fourth conductive layers.

2. The display of claim 1, wherein one or more of the transparent conductive layers comprise indium tin oxide (ITO).

3. This display of claim 1, wherein the touch screen controller is communicatively coupled to the plurality of electrodes of both the third and fourth conductive layers.

* * * * *